US008612292B1

(12) United States Patent
Brown et al.

(10) Patent No.: US 8,612,292 B1
(45) Date of Patent: Dec. 17, 2013

(54) METHOD AND SYSTEM FOR DELIVERING TARGETED RESEARCH INVITATIONS

(75) Inventors: Clinton Douglas Brown, Edgewood, KY (US); Nancy May Kennedy, Dallas, TX (US); Timothy Michael Ryan, Crescent Springs, KY (US); Mary Ann Schmidt, Cincinnati, OH (US)

(73) Assignee: Catalina Marketing Corporation, St. Petersburg, FL (US)

( * ) Notice: Subject to any disclaimer, the term of this patent is extended or adjusted under 35 U.S.C. 154(b) by 1724 days.

(21) Appl. No.: 09/526,535

(22) Filed: Mar. 16, 2000

Related U.S. Application Data

(60) Provisional application No. 60/188,176, filed on Mar. 10, 2000.

(51) Int. Cl.
*G06Q 30/00* (2012.01)
*G06Q 30/02* (2012.01)

(52) U.S. Cl.
CPC .................................. *G06Q 30/0255* (2013.01)
USPC ........................................................ 705/14.53

(58) Field of Classification Search
USPC ................ 705/1, 10, 14, 14.53; 235/375, 380
See application file for complete search history.

(56) References Cited

U.S. PATENT DOCUMENTS

| | | | | |
|---|---|---|---|---|
| 5,388,165 A | * | 2/1995 | Deaton et al. | 382/139 |
| 5,430,644 A | * | 7/1995 | Deaton et al. | 705/14 |
| 5,592,560 A | * | 1/1997 | Deaton et al. | 235/375 X |
| 5,612,527 A | * | 3/1997 | Ovadia | 705/14.38 |
| 5,621,812 A | * | 4/1997 | Deaton et al. | 382/100 |
| 5,649,114 A | * | 7/1997 | Deaton et al. | 705/14 |
| 5,832,457 A | * | 11/1998 | O'Brien et al. | 705/14 |
| 5,832,458 A | * | 11/1998 | Jones | 705/14 |
| 5,857,175 A | * | 1/1999 | Day et al. | 705/14 |
| 5,945,653 A | * | 8/1999 | Walker et al. | 235/380 |
| 6,026,370 A | * | 2/2000 | Jermyn | 705/14 |

(Continued)

FOREIGN PATENT DOCUMENTS

| WO | WO 98/10381 | * | 3/1998 | 705/14 X |
|---|---|---|---|---|
| WO | WO 99/46708 | * | 9/1999 | 705/14 X |
| WO | WO 00/05668 | | 2/2000 | |

OTHER PUBLICATIONS

Marketers' Newest Secret Weapon by Regina Eisman; Incnetive v165n7, pp. 22-30, 128; Jul. 1991.*

(Continued)

*Primary Examiner* — James W Myhre
(74) *Attorney, Agent, or Firm* — Pillsbury Winthrop Shaw Pittman LLP

(57) ABSTRACT

A method, system, and computer program product is disclosed. A purchase data computer receives a customer identifier obtained from a scanner at a point of sale. The customer identifier is associated with a customer in a retail location. The purchase data computer determines a targeted research invitation associated with the customer identifier, the targeted research invitation including contact information to be used by the customer to participate in a marketing research program. Next, the purchase data controller causes a printer to print the targeted research invitation. According to another aspect of the invention, a current purchase of the customer sets off a trigger in the purchase data computer, causing the purchase data computer to print a targeted research invitation at the printer, based on the current purchase. According to another aspect of the invention, a host computer uses prior purchase history of consumers to determine targeted research invitations to be delivered to the consumers.

23 Claims, 13 Drawing Sheets

(56) References Cited

U.S. PATENT DOCUMENTS

| | | | |
|---|---|---|---|
| 6,055,513 A * | 4/2000 | Katz et al. | 705/14 X |
| 6,070,148 A * | 5/2000 | Mori et al. | 705/26 |
| 6,282,516 B1 * | 8/2001 | Giuliani | 705/14 |
| 6,298,330 B1 * | 10/2001 | Gardenswartz et al. | 705/14.25 |
| 6,330,543 B1 * | 12/2001 | Kepecs | 705/14 |
| 7,283,974 B2 * | 10/2007 | Katz et al. | 705/26.41 |
| 2001/0013011 A1 * | 8/2001 | Day et al. | 705/14 |
| 2002/0026353 A1 * | 2/2002 | Porat et al. | 705/14 |
| 2002/0026356 A1 * | 2/2002 | Bergh et al. | 705/14 |

OTHER PUBLICATIONS

On Target at Last by Michael Garry; Progressive Grocer v71n8 pp. 103-110; Aug. 1992.*
PCT IPER PCT/US00/16315.
PCT Declaration of Non-Establishment of ISR PCT/US00/16315.
Office Action in related Canadian application 2,402,944.

* cited by examiner

METHOD AND SYSTEM FOR DELIVERING TARGETED RESEARCH INVITATIONS

CROSS-REFERENCE TO RELATED APPLICATIONS

The present application claims the benefit of and priority to U.S. provisional application Ser. No. 60/188,176 (filed Mar. 10, 2000, now abandoned, which is incorporated herein by reference. The present application is related to technologies described in U.S. patent application Ser. Nos. 60/188,172 (filed Mar. 10, 2000), now abandoned, and 09/527,565 (filed Mar. 16, 2000), currently pending.

BACKGROUND OF THE INVENTION

1. Field of the Invention

The present invention relates generally to the use of a computer system, and more specifically to the use of a computer system in delivering targeted invitations to participate in marketing research.

A research invitation is an announcement providing information for participating in marketing research, such as a survey or other marketing research program.

2. Discussion of the Background

Marketing research is used by advertisers, manufacturers, retailers, and consumer advocacy groups as well as other people, groups, and organizations to provide information on consumer psychology and trends. Information derived from marketing research is used to increase sales and deliver to consumers products that are more likely to be well received by the public. A common form of marketing research involves mass mailings, e-mails, and telephone calls to random consumers. These consumers are invited to participate in surveys, answer questionnaires, and to participate in live interviews with market surveyors. Thus, such marketing research is conducted in a random or quasi-random manner. As a result, many consumers invited to participate in marketing research may have little or no knowledge of the subject matter of the marketing research. As a result, many of the consumers who participate in marketing research are not helpful because they do not use or purchase products that are the subject of the research. Additionally, many consumers are annoyed by invitations, often in the form of "junk mail," because the subject matter of the marketing research is unrelated to the consumers' purchasing behavior and habits.

SUMMARY OF THE INVENTION

Accordingly, one object of this invention is to target research invitations to specific consumers, based on the consumers' purchase histories.

Another object of the present invention is to provide a novel method and system for delivering targeted research invitations to consumers at points of sale in retail locations.

These and other objects are achieved by providing a novel method, system, and computer program product for delivering targeted research invitations. The method, on which the system and computer program product are based, includes the steps of: receiving from a point of sale a customer identifier associated with a customer in a retail location; determining a targeted research invitation associated with the customer identifier, the targeted research invitation including contact information to be used by the customer to participate in marketing research; and delivering the targeted research invitation to the customer.

According to another aspect of the invention, targeted research invitations are determined based on purchase information of at least one item purchased in the retail location. Preferably, purchase triggers, such as predetermined bar code information (e.g., UPC, JAN, and/or EAN information), are used to determine when targeted research invitations should be delivered to the customer. The purchase triggers may be used in place of, or in addition to, the customer identifiers in determining targeted research invitations to be delivered to the customer.

According to another aspect of the present invention, purchase history information of a consumer is stored. The purchase history information includes information of items purchased by the consumer. A targeted research invitation is determined based on the purchase history information, the targeted research invitation including contact information to be used by the consumer to participate in marketing research and an incentive to induce the consumer to participate in the marketing research. The targeted research invitation is then associated with a customer identifier associated with the consumer.

In the manner described above, the present invention overcomes problems associated with conventional marketing research invitations by delivering targeted research invitations. The targeting of the research invitations to a customer may be flexibly tailored based on a current purchase of the customer and/or the customer purchase history.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
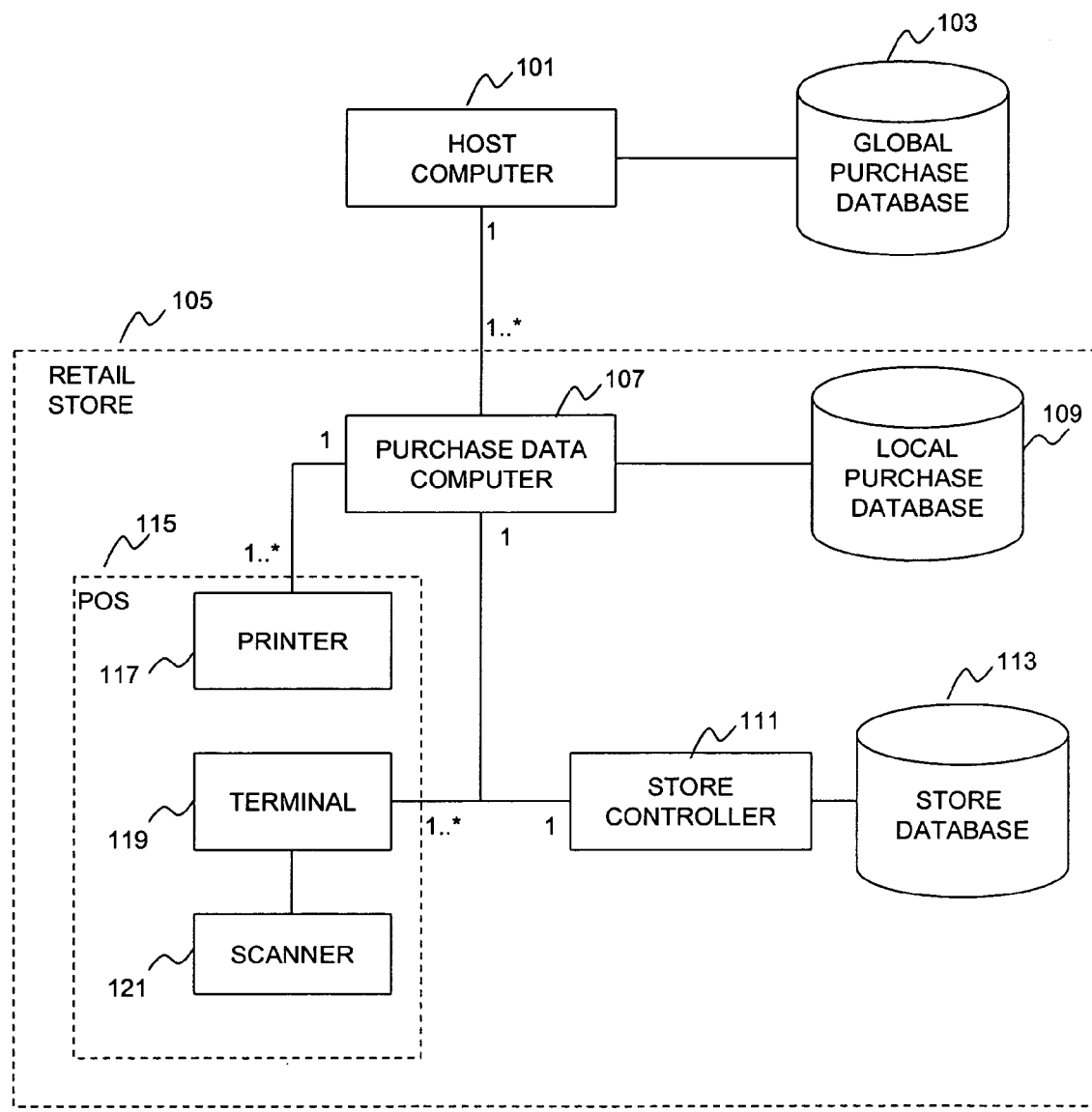
FIG. 1 is a computerized system for storing purchase histories of consumers and delivering targeted research invitations in accordance with an embodiment of the present invention.

Referring now to the drawings, wherein like reference numerals designate identical or corresponding parts throughout the several views, and more particularly to FIG. 1 thereof, there is shown a computerized system for delivering targeted advertisements to customers. The system of FIG. 1 includes a host computer 101, a global purchase database 103, one or more retail stores 105, a purchase data computer 107, a local purchase database 109, a store controller 111, a store database 113, and one or more points of sale 115, each including a printer 117, a terminal 119, and a scanner 121.

Figure 8:
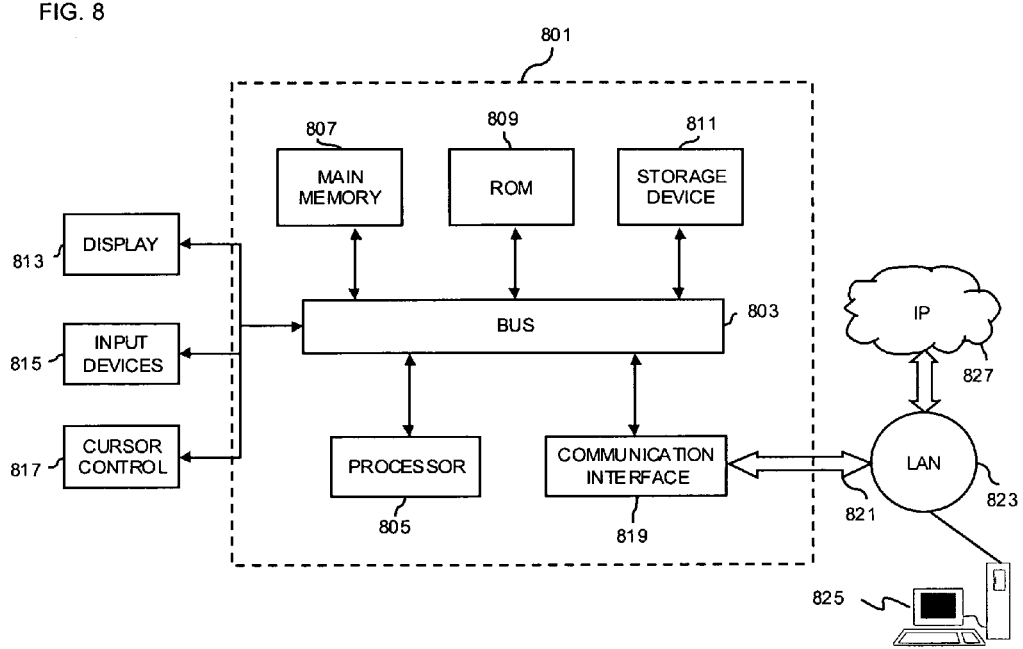
FIG. 8 is a schematic illustration of a computer system programmed to perform one or more of the special purpose functions of the present invention.

The host computer 101 is any suitable workstation, server, or other device, such as the computer system 801 of FIG. 8, for communicating with the purchase data computer 107 and for storing information in and retrieving information from the global purchase database 103. The host computer 101 also determines targeted research invitations to be sent to customers in the retail store 105 in accordance with one embodiment. The host computer 101 communicates with the purchase data computer 107 using any suitable protocol and may be implemented using the computer system 801 of FIG. 8, for example.

The global purchase database 103 is a file that includes records containing information for delivering targeted research invitations, in accordance with the present invention. This information includes information of each purchase made by a customer in the retail store 105. Such information may include, but is not limited to the shelf keeping unit (SKU), brand, size, weight, price, date and time of purchase, and customer identifier (CID) of the customer making the purchase, for example. In one embodiment, portions of this information are obtained from bar codes on purchase items, which are scanned by the scanner 121 during a transaction. These bar codes may contain UPC, JAN, and EAN information. Records in the global purchase database 103 contain fields together with a set of operations for searching, sorting, recombining, and other database functions. The global purchase database 103 may be implemented as two or more databases, if desired. One or more of U.S. Pat. Nos. 5,832,457; 5,649,114; 5,430,644; and 5,592,560 describe techniques for collecting consumer purchase history information and for storing such information in databases such as the global purchase database 103 and the store database 113, for example. U.S. Pat. Nos. 5,832,457; 5,649,144; 5,430,644; and 5,592,560 are incorporated herein by reference. Additionally, techniques for collecting consumer purchase information and for storing such information in databases, such as the global purchase database 103 and the store database 113, are described in other patents owned by Catalina Marketing and/or Catalina Marketing International. Each patent owned by Catalina Marketing and/or Catalina Marketing International is incorporated herein by reference.

The retail store 105 is generically referred to as a retail location and is a place where goods are kept for retail sale to customers. As noted above, many retail stores 105 may be connected to the host computer 101.

The purchase data computer 107 may be implemented using the computer system 801 of FIG. 8, for example, or any other suitable PC, work station, server, or device for communicating with the host computer 101, for storing and retrieving information in the local purchase database 109, for monitoring data transmitted between the terminal 119 and the store controller 111 (i.e., transaction data), and for controlling the printer 117. According to one embodiment, the purchase data computer 107 determines and delivers targeted research invitations.

The local purchase database 109 is a file that includes records containing information for providing targeted research invitations in accordance with the present invention. The records in the local purchase database 109 contain fields for associating bar codes with products in the retail store 105 (e.g., by using UPC, JAN, and/or EAN codes), associating customer identifiers with targeted research invitations, associating consumer identifiers with purchase history information of customers, and associating purchase triggers (e.g., select bar codes) with targeted research invitations. The local purchase database 109 also includes operations for searching, sorting, recombining, and other database functions. The local purchase database 109 may be implemented as two or more databases, if desired. Periodically (e.g., daily), sales transaction information stored in the local purchase database 109 is retrieved by the purchase data computer 107 and sent to the host computer 101, which uses the information to update the purchase history information stored in the global purchase database 103.

The store controller 111 is any computer or device for communicating with the terminal 119 and for using information stored in the store database 113 to carry out transactions at the point of sale (POS) 115. A description of a store controller 111 is found in U.S. Pat. No. 5,173,851, for example.

The store database 113 is a file that includes records containing information for carrying out transactions at the point of sale 115 by scanning bar codes printed on purchased items. The records in the store database 113 contain fields for associating bar codes with products and their corresponding prices. The store database 113 also includes operations for searching, sorting, recombining, and other database functions, and may be implemented as two or more databases, if desired.

The retail store 105 includes one or more points of sale 115. Each point of sale 115 preferably includes a corresponding printer 117, a terminal 119, and a scanner 121. The printer 117 receives printing instructions from the purchase data computer 107. According to an embodiment of the present invention, targeted research invitations are printed by the printer 117 in response to receiving commands from the purchase data computer 107. The terminal 119 may be implemented as a standard cash register and may include a screen, credit card reader, and numeric key pad, for example. The terminal 119 communicates with the store controller 111 and the scanner 121. The scanner 121 may be implemented as any conventional scanning device for reading product information such as an item code (e.g., UDC, EAN, or JAN) from bar codes or other indicia on the product. Information read by the scanner 121 is transmitted to the store controller 111 via the terminal 119. The store controller 111, uses the scanned information and the information stored in the store database 113 to determine information of the transaction including SKU, product price, quantity, and product description, for example.

If there are multiple points of sale 115 within the retail store 105, then each terminal 119 is preferably arranged on a loop with the store controller 111. The purchase data computer 107 is located in front of the store controller 111 on the loop so that information transmitted from the terminals to the store controller is monitored by the purchase data computer 107.

It is to be understood that the system in FIG. 1 is for exemplary purposes only, as many variations of the specific hardware and software used to implement the present invention will be readily apparent to one having ordinary skill in the art. For example, the functionality of the purchase data computer 107 and the store controller 111 may be combined in a single device. These implementations and other implementations of retail computer systems are described in greater detail in one or more of U.S. Pat. Nos. 4,723,212; 4,910,672; 5,173,851; 5,612,868; and 6,026,370, each of which is incorporated herein by reference. To implement these variations as well as other variations, a single computer (e.g., the computer system 801 of FIG. 8) may be programmed to perform the special purpose functions of two or more of any of the devices shown in FIG. 1. On the other hand, two or more programmed computers may be substituted for any one of the devices shown in FIG. 1. Principles and advantages of distributed processing, such as redundancy and replication, may also be implemented as desired to increase the robustness and performance of the system, for example.

The present invention stores information relating to various customers who shop at the retail store 105, the purchase histories of those customers, targeted research invitations, and purchase triggers, for example. This information is stored in one or more memories such as a hard disk, optical disk, magneto-optical disk, and/or RAM, for example. One or more databases, such as the global purchase database 103 and the store database 113, may store the information used to implement the present invention. The databases are organized using data structures (e.g., records, tables, arrays, fields, graphs, trees, and/or lists) contained in one or more memories, such as the memories listed above or any of the storage devices listed below in the discussion of FIG. 8, for example.

FIGS. 2A, 2B, 2C, and 3 depict data structures used for implementing a system for providing targeted research invitations in accordance with an embodiment of the present invention. The data structures are depicted in a relational format, using tables, whereby information stored in one column (i.e., field) of a table is mapped or linked to information stored in the same row (i.e., record) across the other column(s) of the table. These data structures are used by the host computer 101 and/or the purchase data computer 107 to provide targeted research incentives to consumers in accordance with the present invention. The data structures shown in FIGS. 2A, 2B, 2C, and 3 are stored in the global purchase database 103, the local purchase database 109, and/or any other suitable storage device(s) or medium(s).

Figure 2A:
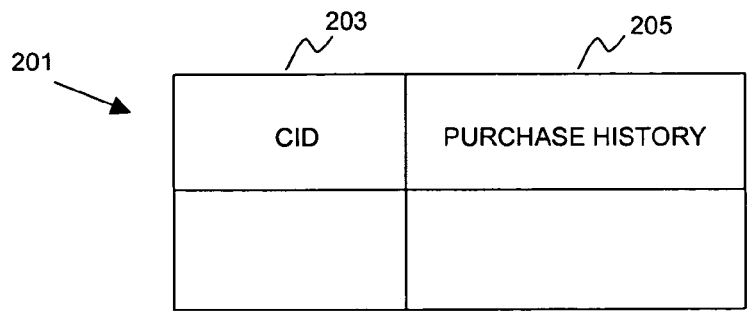
FIG. 2A is a purchase history table for associating customer identifiers (CIDs) with purchase histories of consumers in accordance with an embodiment of the invention.

FIG. 2A is a purchase history table 201 that includes a field 203 for storing consumer identifiers (CIDs) and a field 205 for storing purchase histories of the consumers in the field 203. A CID is any identifier that is scanned, read, or otherwise entered into a computer system at checkout to identify a customer. Each customer may have multiple CIDs. Preferably, the CID is represented as a bar code so that it can be quickly scanned at checkout by the scanner 117, although any other type of machine readable or non-machine readable implementations for storing or displaying identifications may be used, including magnetic strips, memory chips, and smart cards. Examples of possible consumer IDs are credit card numbers, debit card numbers, social security card numbers, driver's license numbers, account numbers, street addresses, names, e-mail addresses, telephone numbers, frequent customer card numbers, shopper card identifications (SCIDs), or shopper loyalty card numbers issued by the retail store 105, although any other suitable form of identification may be used. Preferably, the field 205 is divided into several subfields for separately storing purchase data such as the SKU, location of the purchase, a description of the items purchased, the price of each item purchased, date and time of the transaction, and any other desired information of consumers' transactions.

Figure 2B:
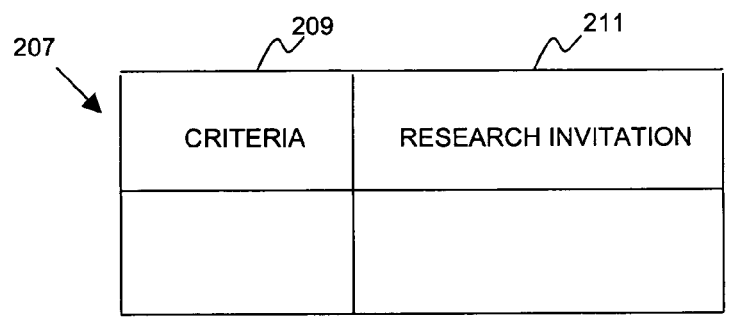
FIG. 2B is a purchase history criteria table for associating purchase history criteria with research invitations targeted to consumers having purchase histories that meet the corresponding purchase history criteria, in accordance with an embodiment of the invention.

FIG. 2B is a purchase history criteria table 207 that includes a field 209 for storing purchase history criteria and a field 211 for storing targeted research invitations. Purchase history criteria are criteria that must be met by a consumer, based on the consumer's purchase history in the field 205, to receive the corresponding research invitation(s) in the same record in the field 211. The present invention is able to target research invitations by requiring that a consumer's observed purchase history meets the criteria associated with a particular research invitation. For example, a particular invitation may only be given to people who appear to be loyal to brand X or who have purchased cough syrup in the last week. Rewards for participating in marketing research may be targeted in the same manner. Examples of research invitations stored in the field 211 are provided below with respect to FIGS. 4A, 4B, and 9A through 9G.

Figure 2C:
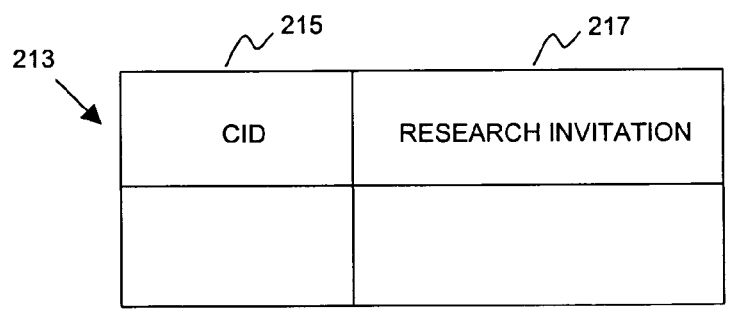
FIG. 2C is a research invitation table for associating CIDs with targeted research invitations, according to an embodiment of the invention.

FIG. 2C is a research invitation table 213 including a field 215 for storing CIDs and a field 217 for storing research invitations. The research invitation table 213 associates each CID with one or more research invitations stored in the same record in the field 217. Using the research invitation table 213, the purchase data computer 107 may determine research invitations to deliver to a consumer based on the consumer's CID.

Figure 3:
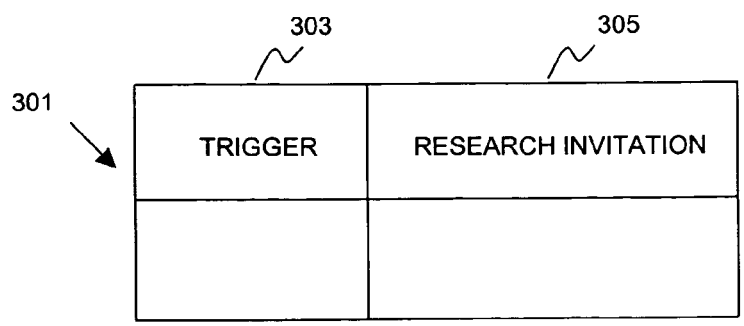
FIG. 3 is a purchase trigger table for associating purchase triggers with targeted research invitations, according to an embodiment of the invention.

FIG. 3 is a purchase trigger table 301 including a field 303 for storing purchase triggers and a field 305 for storing research invitations. The purchase triggers in the field 303 may be bar codes or other information, which when sent from the terminal 119 to the store controller 111 are monitored by the purchase data computer 107, which causes the corresponding research invitation(s) in the field 305 to be printed at the printer 117. Thus, the purchase trigger table 301 associates purchase triggers with research invitations to be delivered to a customer whose transaction meets one or more of the purchase triggers in the field 303.

Figure 4A:
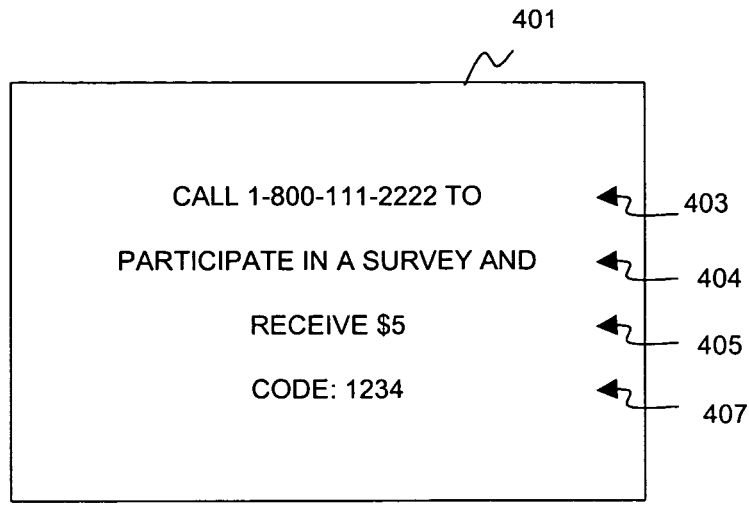
FIGS. 4A and 4B are exemplary research invitations to participate in marketing research.
Figure 4B:
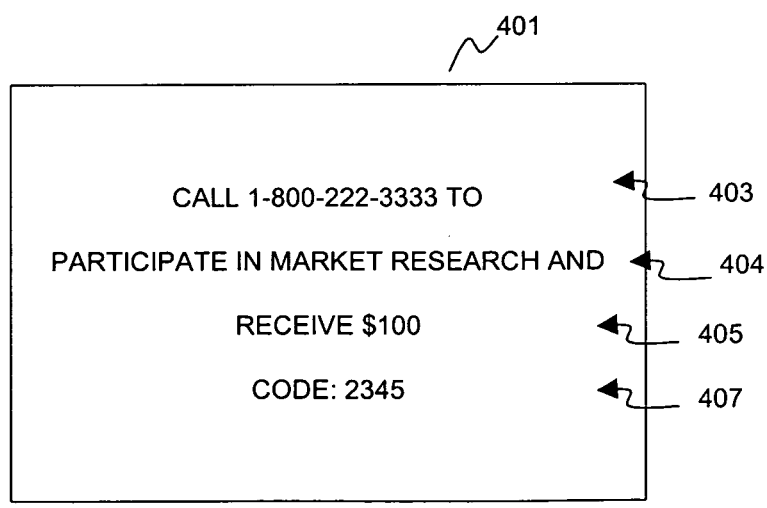

FIGS. 4A, 4B, and 9A through 9G are various examples of research invitations that may be printed at the printer 117, for example. As shown in FIGS. 4A and 4B, each research invitation 401 includes contact information 403, condition information 404, reward information 405, and a code (e.g., a virtual personal identification number (PIN) 407). The contact information is a telephone number, Web site, Web page, street address, uniform resource locator (URL) and/or e-mail address, for example, that a person may use to initiate participation in marketing research. The condition 404 indicates what a person must do to receive the reward 405. Examples of conditions 404 are participation in surveys, marketing research, and/or completing questionnaires. The reward 405 may be a check, coupon, discount, certificate, redeemable medium, and/or other positive benefit to a person who meets the condition, such as entry in a sweepstakes. The code 407 is an identification that uniquely identifies each research invitation. In an embodiment of the invention, when a person attempts to receive the reward 405 by participating in the marketing research, the person is asked to provide the code 407 on the research invitation 401. In this manner, the surveyor, group or person conducting the marketing research, and/or other entity can avoid providing more than one reward 407 for each research invitation 401. This embodiment may be implemented by storing the code 407 with the other research invitation information in the fields 211, 217, and 305, for example. The codes 407 are also provided to the entity conducting the marketing research or rewarding the people participating in the marketing research (i.e., surveyor), for example, so that each code 407 may be recognized by the surveyor, and only one reward is provided for each code 407. The use of PINs also prevents consumers from being double counted in marketing research surveys, resulting in better data. This embodiment may utilize PIN technology such as described in U.S. Pat. Nos. 5,915,007 and 5,892,827, each of which is incorporated herein by reference.

Figure 9A:
FIGS. 9A through 9G are additional examples of targeted research invitations that may be delivered to consumers according to different embodiments of the present invention.
Figure 9B:
Figure 9C:
Figure 9D:
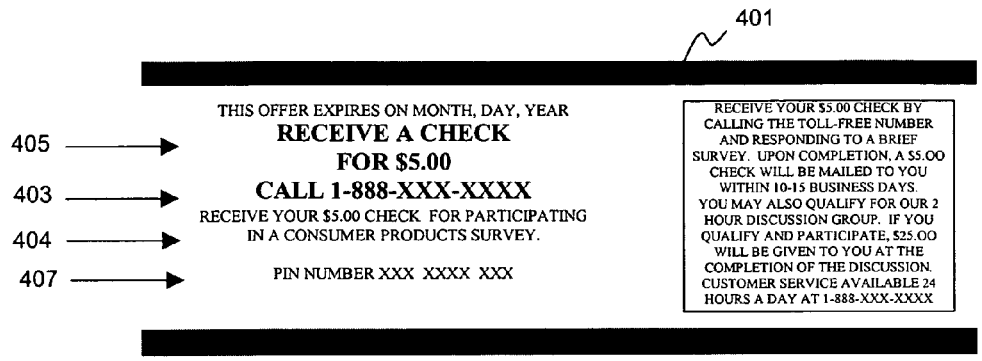
Figure 9E:
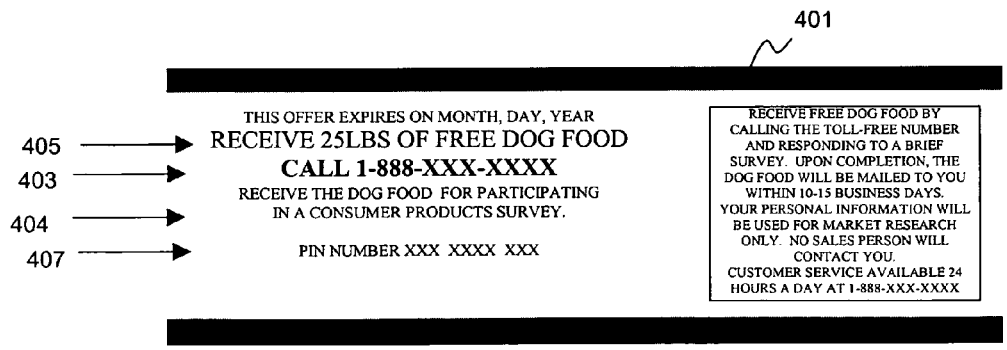
Figure 9F:
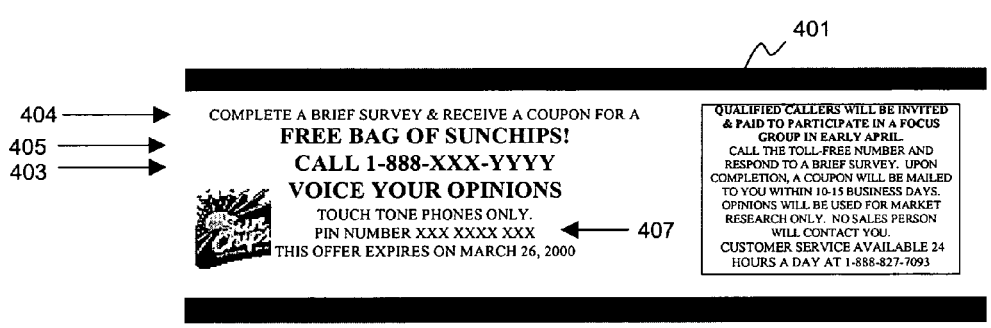
Figure 9G:

It is to be understood that each research invitation 401 may be tailored to suit different purposes, as desired, and may omit one or more of the items 403, 404, 405, and 407. Also, as shown by FIG. 9G, for example, the rewards and the subject of the marketing research may not involve groceries and retail stores. The research invitations 401 may also include other information indicating how long the offer of the research invitation is good for and what equipment (e.g., a touchtone phone for interactive voice response (IVR)) may be necessary to participate in the marketing research, as well as other conditions necessary to receive the reward 405.

Figure 5A:
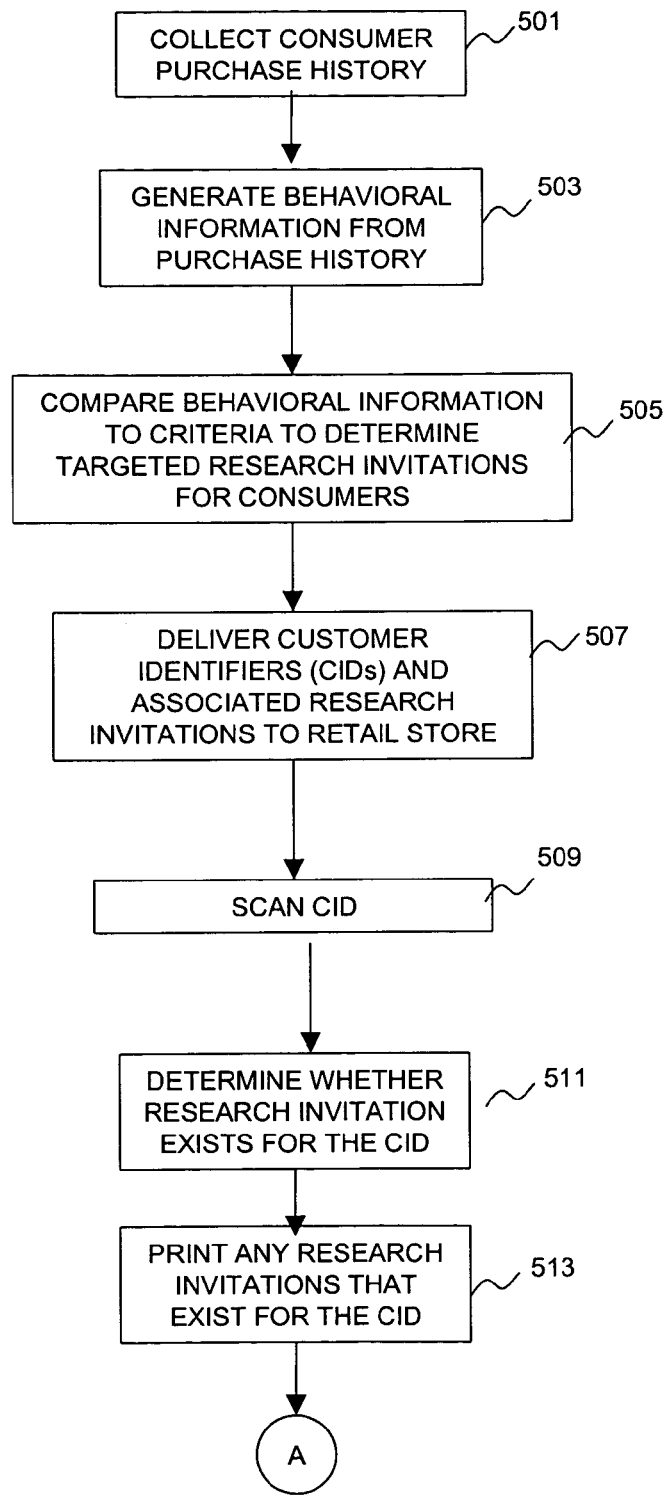
FIG. 5A is a flowchart describing a process for targeting research invitations based on consumers' purchase histories, in accordance with an embodiment of the invention.

FIG. 5A is a flowchart for explaining how targeted research invitations are delivered, based on customers' purchase histories. In step 501 the host computer 101 polls the purchase data computer 107 in each of the retail stores 105 for purchase history information to update the purchase history information stored in the global purchase database 103. Then, in step 503 the host computer 101 generates behavioral information from the purchase history information stored in the global purchase database 103. This behavioral information may be any information that a marketing researcher (i.e., surveyor) wishes to use to determine whether a targeted research invitation should be delivered to a consumer. Examples of behavioral information are whether a consumer has purchased at least five pounds of dog food per month for the last year, whether the consumer has purchased cold medicine in the last week, and whether the consumer consistently purchases lactose-free milk.

In step 505 the host computer 101 compares the behavioral information generated in step 503 to purchase criteria stored in the field 209 of the purchase criteria table 207. If the behavioral information of any consumer meets the purchase criteria in the field 209, then the consumer's CID is stored in the field 215 and the corresponding research invitation in the field 211 is stored in the field 217 of the research invitation table. In this manner, the research invitation table 213 is populated with CIDs and associated targeted research invitations to be delivered to the corresponding consumers.

In step 507 the host computer 101 delivers the research invitation table 213 to the retail stores 105. If desired, the research invitation table 213 is broken up into separate research invitation tables for each retail store 105. If desired, only the CIDs of customers that frequent the corresponding retail store 105 are provided to each retail store 105 in order to reduce the effect of storage and transmission constraints and to prevent CID information from being given to different retail stores. The research invitation table 213 is received by the purchase data computer 107 and the retail store 105 and stored in the local purchase database 109. Different research invitation tables 213 may be constructed for different marketing research programs, and the tables 213 may be updated and/or modified as desired.

In step 509 a customer makes a purchase in the retail store 105 and the customer's CID is scanned by the scanner 121 at the point of sale 115. The customer's CID is transmitted to the terminal 119, which in turn transmits the CID to the store controller 111. The transmissions between the terminal 119 and the store controller 111 are monitored by the purchase data computer 107, which uses the CID in step 511 to determine whether the same CID exists in the field 215 of the research invitation table. In step 513, if the CID is found in the field 215, then the corresponding research invitation(s) in the field 217 are printed by the printer 117 at the point of sale 115. In this manner, the research invitations targeted to the customer whose CID was scanned are delivered to the customer at the point of sale 115. In one embodiment, the purchase data computer 107 is programmed to deliver a targeted research invitation to a customer no more than one time.

Figure 5B:
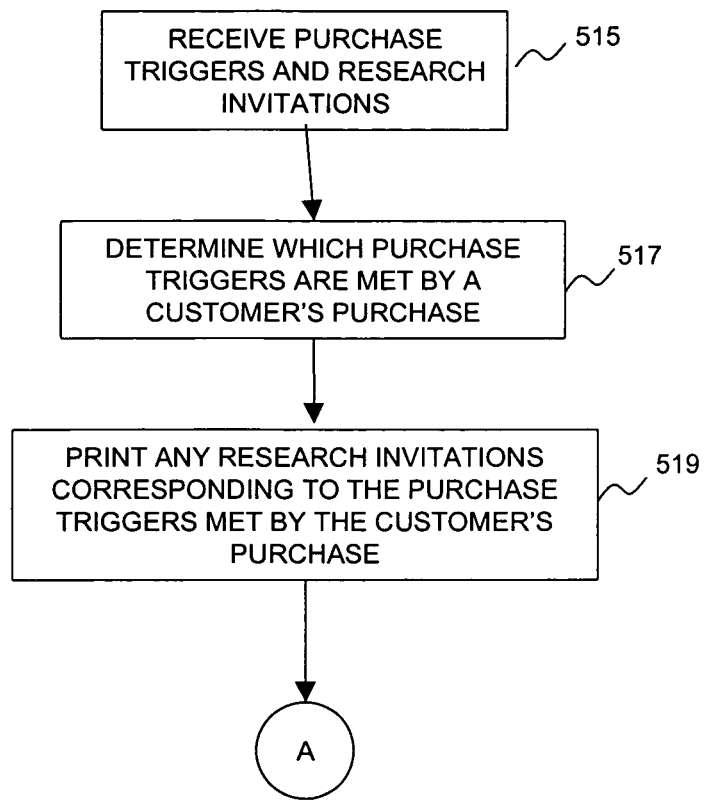
FIG. 5B is a flowchart describing a process for targeting research invitations to a customer based on a current purchase of the customer, in accordance with an embodiment of the invention.

FIG. 5B is a flowchart explaining how targeted research invitations are delivered based on triggering purchases in a current transaction at the point of sale 115. In step 515, the purchase data computer 107 receives purchase triggers and research invitations, which are stored in the local purchase database 109. The purchase triggers and research invitations may be downloaded from the host computer 101, input by hand, or transferred by any other suitable means to the purchase data computer 107 (e.g., by floppy disk or via a connection to another computer). The purchase triggers and research invitations are stored in the purchase trigger table 301 in respective of the fields 303 and 305. The purchase triggers correspond to information of a current purchase at the point of sale 115. For example, the purchase triggers may be bar code information and/or SKU information associated with corresponding targeted research invitations in the field 305. Thus, each purchase trigger may identify one or more products.

In step 517 the purchase data computer 107 monitors information of a current purchase transmitted from the terminal 119 to the store controller 111. The information of the current purchase may be generated upon scanning a bar code on a product or by any other suitable method for transmitting information from a terminal at a point of sale to a store controller. The purchase data computer 107 compares the information of the current purchase with the purchase trigger stored in the field 303. If there is a match between any of the purchase triggers in the field 303 and the information of the current purchase monitored by the purchase data computer 107 (e.g., if a product identified by the purchase trigger is purchased), then in step 519 the purchase data computer 107 causes the printer 117 to print the corresponding targeted research invitations in the field 305.

Figure 6A:
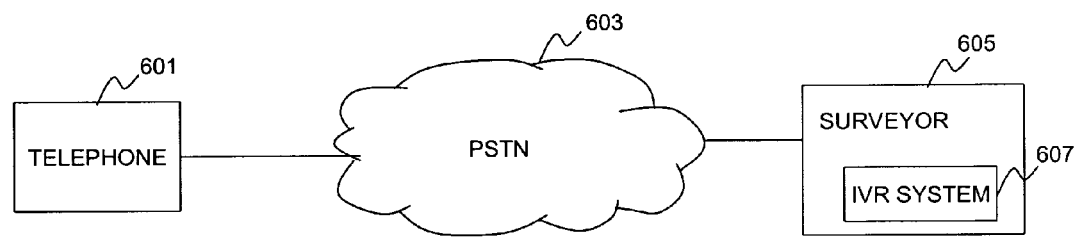
FIG. 6A is a schematic illustration of a system for conducting marketing research over the telephone in accordance with an embodiment of the invention.

FIG. 6A is a system for conducting marketing research over the telephone in accordance with an embodiment of the invention. The system includes a conventional telephone 601, a conventional public switched telephone network 603 connecting the telephone 601 to a surveyor 605 that includes an interactive voice response (IVR) system 607. The surveyor 605 is any person, device, organization, association, or other entity for conducting marketing research.

Figure 6B:
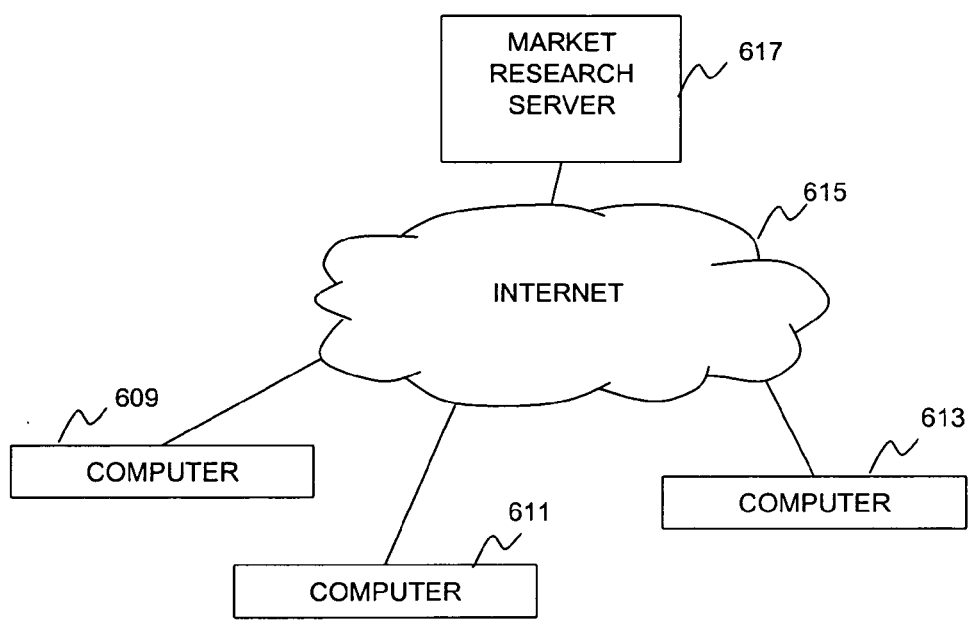
FIG. 6B is a schematic illustration of a system for conducting marketing research over the Internet, in accordance with an embodiment of the invention.

FIG. 6B is a system for conducting marketing research over the Internet. Various computers (e.g., the computers 609, 611, and 613) are connected by the Internet 615 to a marketing research server 617. The marketing research server 617 is a computer, server, device, and/or software for conducting and/or facilitating marketing research over the Internet 615.

Figure 7A:
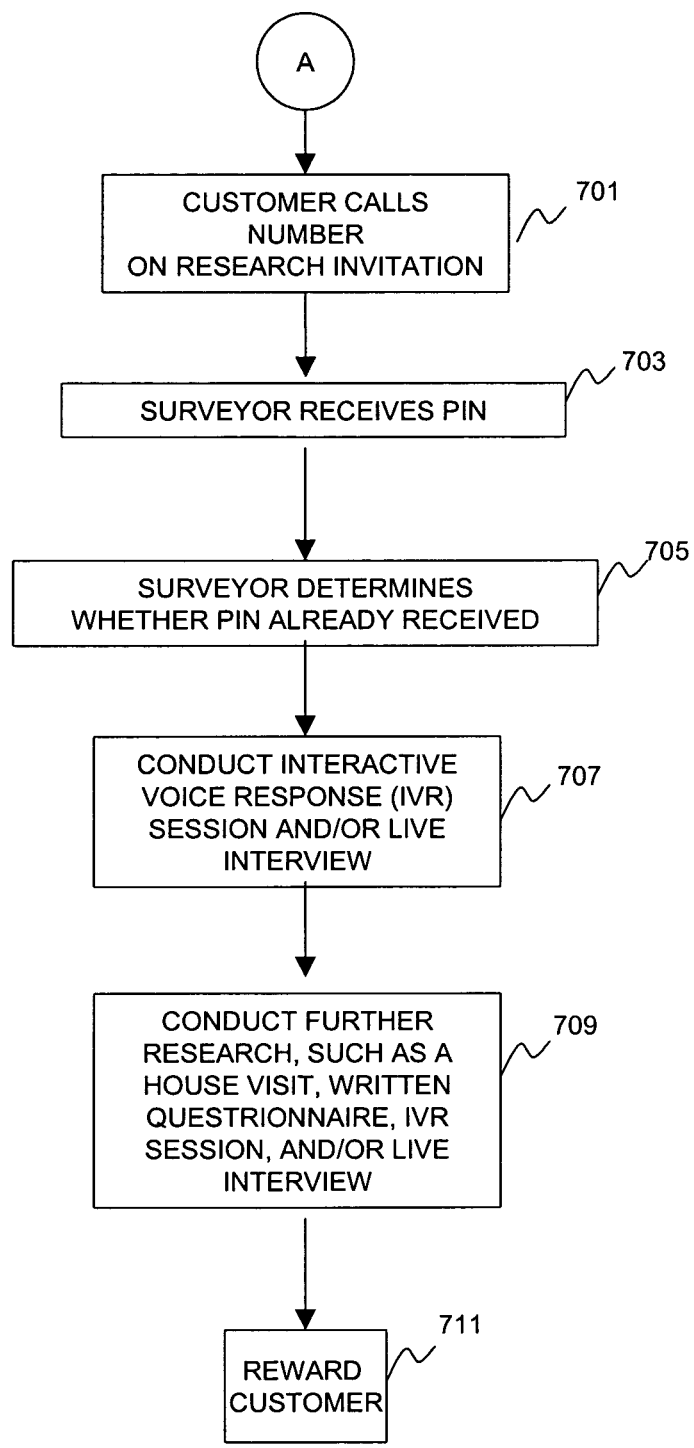
FIGS. 7A and 7B are flowcharts describing a process for conducting marketing research in accordance with an embodiment of the invention.

FIG. 7A is flowchart explaining how marketing research may be performed using the exemplary system of 6A according to an embodiment of the invention. In step 701a customer uses the contact information 403 on a targeted research invitation 401 to contact the surveyor 605. If the contact information is a telephone number, then the customer simply uses the telephone 601 to contact the surveyor 605. In step 703, the surveyor 605 asks the customer to input the code 407 shown on the targeted research invitation 401. Interaction with the surveyor 605 may be partially or completely automated, as desired. The code 407 may be a virtual PIN that is generated when the targeted research invitation 401 is printed and transmitted to the surveyor 605 from the purchase data computer 107 or the host computer 101 over a computerized communications network, for example. Alternatively, a list of predetermined, encrypted PINs to be printed on research invitations 401 is provided to the surveyor 605 prior to the delivery of invitations in the stores 105. As shown in FIG. 6A the host computer 101 is connected to the surveyor 605 via the PSTN 603, and the host computer 101 transmits codes (e.g., virtual PINs) 407 on the targeted research invitations 401 to a computer of the surveyor 605 and/or the IVR system 607 before, during, or after delivery of the codes 407 to the purchase data computer 107.

In step 705 the surveyor 605 determines whether the PIN entered in step 703 has already been received. If the PIN has not already been received, then the process proceeds to step 707 in which an IVR session and/or a live interview is conducted. In alternative embodiments, surveys may be conducted by the mail or by Internet or any other known manner in step 707 or in additional steps, such as step 709 in which further marketing research in conducted. Such marketing research may include a house visit, written questionnaire, IVR session and/or live interview.

Then, in step 711, the customer is rewarded with the reward 405 on the targeted research incentive 401. The customer may be provided with the reward in any known manner. According to one embodiment, if the reward is cash, a check for the amount specified in the field 405 is delivered by mail to the customer. Other forms of rewards are free long distance minutes, free virtual money which can be used to purchase products over the Internet, coupons for products sold at the retail store 105, and redeemable certificates for free items in the store 105.

Figure 7B:
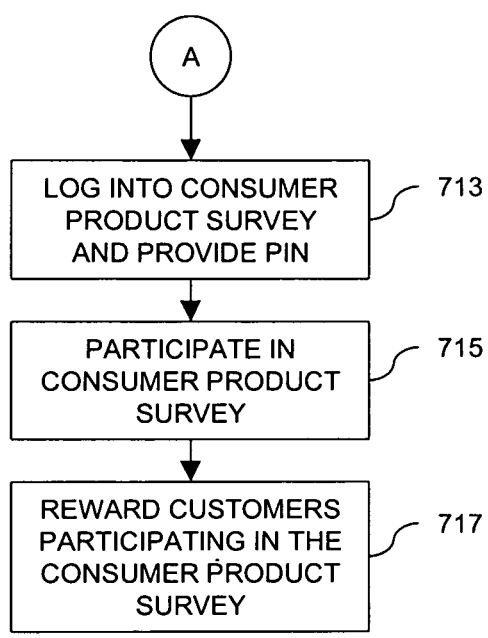

FIG. 7B is a flowchart for explaining how marketing research may be conducted over the Internet 615. In step 713, a customer uses a Web browser running on the computer 609 to view a web page identified by a URL specified by the contact information 403 on a targeted research invitation 401 delivered to the customer. Additionally, in step 713 the customer is asked to enter the code 407 appearing on the targeted research invitation 401. The code 407 operates the same as the virtual PIN, discussed above, to prevent the same research invitation from being accepted more than once and to prevent double counting of participants if the marketing research is a survey or other form of research that benefits from data integrity.

Then, in step 715, the customer participates in marketing research, such as a consumer product survey. Upon completion of the consumer's participation in the research program, the consumer is rewarded in step 717. Step 717 may be implemented in the same manner as step 711. However, it may be preferable to reward consumers who participate in marketing research conducted over the Internet with Internet-based rewards, such as "Internet money," which may be redeemed to receive prizes that "cost" a specified amount of Internet money.

All or a portion of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

FIG. 8 illustrates a computer system 801 upon which an embodiment according to the present invention may be implemented. Computer system 801 includes a bus 803 or other communication mechanism for communicating information, and a processor 805 coupled with bus 803 for processing the information. Computer system 801 also includes a main memory 807, such as a random access memory (RAM) or other dynamic storage device (e.g., dynamic RAM (DRAM), static RAM (SRAM), synchronous DRAM (SDRAM), flash RAM), coupled to bus 803 for storing information and instructions to be executed by processor 805. In addition, main memory 807 may be used for storing temporary variables or other intermediate information during execution of instructions to be executed by processor 805. Computer system 801 further includes a read only memory (ROM) 809 or other static storage device (e.g., programmable ROM (PROM), erasable PROM (EPROM), and electrically erasable PROM (EEPROM)) coupled to bus 803 for storing static information and instructions for processor 805. A storage device 811, such as a magnetic disk or optical disc, is provided and coupled to bus 803 for storing information and instructions.

The computer system 801 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 801 using an appropriate device bus (e.g., a small computer system interface (SCSI) bus, an enhanced integrated device electronics (IDE) bus, or an ultra-direct memory access (DMA) bus). The computer system 801 may additionally include a compact disc reader, a compact disc reader-writer unit, or a compact disc juke box, each of which may be connected to the same device bus or another device bus.

Computer system 801 may be coupled via bus 803 to a display 813, such as a cathode ray tube (CRT), for displaying information to a computer user. The display 813 may be controlled by a display or graphics card. The computer system includes input devices, such as a keyboard 815 and a cursor control 817, for communicating information and command selections to processor 805. The cursor control 817, for example, is a mouse, a trackball, or cursor direction keys for communicating direction information and command selections to processor 805 and for controlling cursor movement on the display 813. In addition, a printer may provide printed listings of the data structures shown in FIGS. 2A, 2B, 2C, and 3 or any other data stored and/or generated by the computer system 801.

The computer system 801 performs a portion or all of the processing steps of the invention in response to processor 805 executing one or more sequences of one or more instructions contained in a memory, such as the main memory 807. Such instructions may be read into the main memory 807 from another computer-readable medium, such as storage device 811. One or more processors in a multi-processing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

As stated above, the system 801 includes at least one computer readable medium or memory programmed according to the teachings of the invention and for containing data structures, tables, records, or other data described herein. Stored on any one or on a combination of computer readable media, the present invention includes software for controlling the computer system 801, for driving a device or devices for implementing the invention, and for enabling the computer system 801 to interact with a human user, e.g., a consumer. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 805 for execution. A computer readable medium may take many forms, including but not limited to, non-volatile media, volatile media, and transmission media. Non-volatile media includes, for example, optical, magnetic disks, and magneto-optical disks, such as storage device 811. Volatile media includes dynamic memory, such as main memory 807. Transmission media includes coaxial cables, copper wire and fiber optics, including the wires that comprise bus 803. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 805 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 801 may receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes a communication interface 819 coupled to bus 803. Communication interface 819 provides a two-way data communication coupling to a network link 821 that is connected to a local network (e.g., LAN 823). For example, communication interface 819 may be a network interface card to attach to any packet switched local area network (LAN). As another example, communication interface 819 may be an asymmetrical digital subscriber line (ADSL) card, an integrated services digital network (ISDN) card, or a modem to provide a data communication connection to a corresponding type of telephone line. Wireless links may also be implemented. In any such implementation, communication interface 819 sends and receives electrical, electromagnetic or optical signals that carry digital data streams representing various types of information.

Network link 821 typically provides data communication through one or more networks to other data devices. For example, network link 821 may provide a connection through LAN 823 to a host computer 825 or to data equipment operated by a service provider, which provides data communication services through an IP (Internet Protocol) network 827 (e.g., the Internet 615) or any other suitable network using any known protocol (e.g., IPX). LAN 823 and IP network 827 both use electrical, electromagnetic or optical signals that carry digital data streams. The signals through the various networks and the signals on network link 821 and through communication interface 819, which carry the digital data to and from computer system 801, are exemplary forms of carrier waves transporting the information. Computer system 801 can transmit notifications and receive data, including program code, through the network(s), network link 821 and communication interface 819.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer-implemented method of delivering targeted research invitations to customers based on customer identifiers, the method comprising:
   storing a list of customer identifiers;
   storing targeted research invitations, each customer identifier being associated with at least one of the targeted research invitations;
   receiving, from a point of sale, a customer identifier associated with a customer in a retail location;
   determining a targeted research invitation associated with the customer identifier, the targeted research invitation including contact information to be used by the customer to participate in marketing research, wherein determining the targeted research invitation comprises:
      matching the customer identifier received at the point of sale with the same customer identifier in the stored list of customer identifiers; and
      determining the targeted research invitation on the basis of at least one stored targeted research invitation previously delivered to the customer and also associated with the customer identifier;
   delivering the targeted research invitation to the customer; and
   storing the targeted research invitation delivered to the customer.

2. A method according to claim 1, wherein the targeted research invitation is associated with the customer identifier on the basis of the customer's prior purchase history, the prior purchase history including purchase history information of at least one item purchased by the customer prior to the step of receiving the customer identifier.

3. A method according to claim 2, further comprising:
   receiving the customer identifier and the associated targeted research invitation from a host computer.

4. A method according to claim 1, wherein the targeted research invitation comprises an incentive to induce the customer to participate in the marketing research.

5. A method according to claim 1, wherein the targeted research invitation comprises a unique code number identifying the targeted research invitation.

6. A method according to claim 1, wherein delivering the targeted research invitation comprises:
printing the targeted research invitation at the point of sale.

7. A method according to claim 1, wherein receiving the customer identifier comprises:
receiving the customer identifier obtained via scanning a card presented by the customer at the point of sale.

8. A method according to claim 1, wherein the contact information comprises at least one of a telephone number, a street address, an e-mail address, or a uniform resource locator (URL).

9. A system for delivering targeted research invitations to customers based on customer identifiers, comprising:
a memory device having embodied therein:
a list of customer identifiers; and
targeted research invitations, each customer identifier being associated with at least one of the targeted research invitations; and
a processor in communication with said memory device, said processor configured to:
receive, from a point of sale, a customer identifier associated with a customer in a retail location;
determine a targeted research invitation associated with the customer identifier, the targeted research invitation including contact information to be used by the customer to participate in marketing research, wherein, to determine the targeted research invitation, the processor is further configured to:
match the customer identifier received at the point of sale with the same customer identifier in the stored list of customer identifiers; and
determine the targeted research invitation on the basis of at least one targeted research invitation previously delivered to the customer and also associated with the customer identifier;
deliver the targeted research invitation to the customer; and
store the targeted research invitation delivered to the customer.

10. A system according to claim 9, wherein the targeted research invitation is associated with the customer identifier on the basis of the customer's prior purchase history, the prior purchase history including purchase history information of at least one item purchased by the customer prior to the step of receiving the customer identifier.

11. A system according to claim 10, wherein the processor is further configured to receive the customer identifier and the associated targeted research invitation from a host computer.

12. A system according to claim 9, wherein the targeted research invitation comprises an incentive to induce the customer to participate in the marketing research.

13. A system according to claim 9, wherein the targeted research invitation comprises a unique code number identifying the targeted research invitation.

14. A system according to claim 9, wherein the processor is further configured to print the research invitation at the point of sale.

15. A system according to claim 9, wherein the processor is further configured to receive the customer identifier obtained via a scan of a card presented by the customer at the point of sale.

16. A system according to claim 9, wherein the contact information comprises at least one of a telephone number, a street address, an e-mail address, or a uniform resource locator (URL).

17. A system, comprising:
a memory device having embodied therein:
a list of purchase triggers; and
targeted research invitations, each purchase trigger being associated with at least one of the targeted research invitations;
a processor in communication with said memory device, said processor configured to:
receive, from a point of sale, purchase information of at least one item purchased by a customer in a retail location;
determine a targeted research invitation based on the purchase information received from the point of sale, the targeted research invitation including contact information to be used by the customer to participate in marketing research,
wherein, to determine the targeted research invitation, the processor is further configured to:
compare the purchase information received from the point of sale with the purchase triggers; and
determine the targeted research invitation on the basis of at least one stored targeted research invitation previously delivered to the customer and also associated with the purchase triggers met by the purchase information;
deliver the targeted research invitation to the customer; and
store the targeted research invitation delivered to the customer.

18. A system according to claim 17, wherein the targeted research invitation comprises an incentive to induce the customer to participate in the marketing research.

19. A system according to claim 17, wherein the targeted research invitation comprises a unique code number identifying the targeted research invitation.

20. A system according to claim 17, wherein the processor is further configured to print the research invitation at the point of sale.

21. A system according to claim 17, wherein the processor is further configured to receive the customer identifier obtained via a scan of a card presented by the customer at the point of sale.

22. A system according to claim 17, wherein the contact information comprises at least one of a telephone number, a street address, an e-mail address, or a uniform resource locator (URL).

23. A system according to claim 17, wherein the processor is further configured to determine the targeted research invitation on the basis of the customer's prior purchase history.

* * * * *